United States Patent Office 3,084,202
Patented Apr. 2, 1963

3,084,202
1-(IODOETHYNYL) CYCLOHEXANOL
Mary S. Tomita, Walnut Creek, Calif., assignor to The Dow Chemical Company, Midland, Mich., a corporation of Delaware
No Drawing. Filed June 9, 1960, Ser. No. 34,894
1 Claim. (Cl. 260—631)

This invention is directed to 1-(iodoethynyl)-cyclohexanol represented by the structure

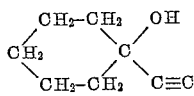

This new compound is a white crystalline solid soluble in many common organic solvents such as ethanol, isopropyl alcohol, xylene and acetone and is of very low solubility in water and in dilute alkali. The compound is useful as a parasiticide and particularly as a herbicide for the control of undesirable weeds and plants.

The 1-(iodoethynyl)-cyclohexanol may be prepared by reacting together a positive iodine, I+, with 1-ethynylcyclohexanol. The positive iodine may be provided by many well known reagents; it is conveniently provided by sodium hypochlorite and potassium iodide or iodine and alkali.

In carrying out the preparation, approximately equimolar proportions of 1-ethynylcyclohexanol and a source of positive iodine are mixed together in a liquid reaction medium. The preparation is preferably carried out in an aqueous medum with the positive iodine being prepared in situ from sodium hypochlorite and potassium iodide. Because of the limited solubility of 1-ethynylcyclohexanol in water, it is desirable that the aqueous medium contain, together with the water, a water-miscible solvent. Suitable water-miscible solvents include dimethoxyethane, dioxane, tetrahydrofuran, ethylene glycol, diethylene glycol and others. The reaction takes place over a temperature range of from about −10° to 30° C. over a period of from about a few minutes to several hours with the formation of the desired 1-(iodoethynyl)cyclohexanol product. In the preferred method, the initial mixing is carried out at from −10° to +15° C. and the reaction completed at higher temperature. The product may be recovered and purified by conventional procedures such as by decantation or filtration, followed by washing and recrystallization.

In a representative preparation, a solution of 36.5 grams (0.22 mole) of potassium iodide in 46 milliliters of water was added to a solution of 24 grams (0.2 mole) of 1-ethynylcyclohexanol in 30 milliliters of dimethoxyethane. To the resulting mixture was added a solution of sodium hypochlorite freshly prepared by bubbling 16.0 grams (0.9 gram atom) of chlorine into a solution of 18.4 grams (0.46 mole) of sodium hydroxide in 45 milliliters of water. The addition was carried out slowly in several portions over a period of 1.6 hours while the temperature of the reaction mixture was maintained between 0° and +5° C. by external cooling. During the addition, a reaction took place with the formation of an immiscible organic phase. After completion of the addition, the reaction mixture was allowed to warm to room temperature with stirring over a one hour period. The organic phase was decanted and washed several times with water whereupon a 1-(iodoethynyl)cyclohexanol product precipitated as a solid in the liquid mixture. The product was recovered by filtration and thereafter washed with and recrystallized from hexane to obtain a purified 1-(iodoethynyl)cyclohexanol product melting from 83° to 87° C. The yield of the product was 24.7 grams or 50 percent of theoretical. The structure of the product was confirmed by infrared spectral analysis.

The products of the present invention are useful in horticultural and agricultural applications. They are particularly useful as herbicides for the control of growth of seeds and seedlings of such undesirable species as canary grass, crabgrass, Essex rape and Ageratum spp. Furthermore, 1-(iodoethynyl)cyclohexanol is particularly suitable as a persistence herbicide for broadleaf and narrowleaf plant species. In a representative operation for such use, the administration of an aqueous dispersion containing 1-(iodoethynyl)cyclohexanol in soil at a rate of 50 pounds per acre is found to give complete vegetative controls for periods up to 3 months.

1-(iodoethynyl)cyclohexanol is also useful for the control of certain plant diseases wherein plant roots are attacked. Representative pathogens which may be controlled by 1-(iodoethynyl)cyclohexanol include *Fusarium oxysporum lycopersici* and *Rhizoctania solani*.

I claim:
1-(iodoethynyl)cyclohexanol.

References Cited in the file of this patent
UNITED STATES PATENTS
1,841,768    Straus et al. _____ Jan. 19, 1932

OTHER REFERENCES
P'an et al.: J. Pharmacol. Exptl. Therap., Vol. 109, pages 268–73 (1953). (Copy in Library.)